United States Patent
Cagnani et al.

(10) Patent No.: US 9,145,495 B2
(45) Date of Patent: Sep. 29, 2015

(54) PROPYLENE POLYMERS HAVING BROAD MOLECULAR WEIGHT DISTRIBUTION

(75) Inventors: Camillo Cagnani, Ferrara (IT); Piet Roose, Brussels (BE); Cees Besems, Rijen (NL)

(73) Assignee: Basell Poliolefine Italia S.r.l., Milan (IT)

( * ) Notice: Subject to any disclaimer, the term of this patent is extended or adjusted under 35 U.S.C. 154(b) by 809 days.

(21) Appl. No.: 11/922,821

(22) PCT Filed: Jun. 26, 2006

(86) PCT No.: PCT/EP2006/063535
§ 371 (c)(1),
(2), (4) Date: Dec. 21, 2007

(87) PCT Pub. No.: WO2007/003523
PCT Pub. Date: Jan. 11, 2007

(65) Prior Publication Data
US 2009/0030098 A1   Jan. 29, 2009

Related U.S. Application Data

(60) Provisional application No. 60/697,488, filed on Jul. 8, 2005.

(30) Foreign Application Priority Data

Jul. 1, 2005 (EP) .................................... 05106024

(51) Int. Cl.
| | |
|---|---|
| C08L 23/00 | (2006.01) |
| C08L 23/10 | (2006.01) |
| C08J 9/14 | (2006.01) |
| C08L 23/08 | (2006.01) |
| C08L 23/12 | (2006.01) |

(52) U.S. Cl.
CPC .. *C08L 23/10* (2013.01); *C08J 9/14* (2013.01); *C08L 23/08* (2013.01); *C08L 23/12* (2013.01); *C08J 2323/10* (2013.01)

(58) Field of Classification Search
CPC .......... C08L 23/08; C08L 23/10; C08L 23/12
USPC ........................................ 525/240; 526/351
See application file for complete search history.

(56) References Cited

U.S. PATENT DOCUMENTS

| | | | |
|---|---|---|---|
| 4,399,054 A | 8/1983 | Ferraris et al. | |
| 4,469,648 A | 9/1984 | Ferraris et al. | |
| 4,472,520 A * | 9/1984 | Zucchini et al. | 502/104 |
| 4,634,740 A | 1/1987 | Fujita et al. | |
| 4,916,198 A | 4/1990 | Scheve et al. | |
| 5,047,485 A | 9/1991 | DeNicola, Jr. | |
| 5,139,985 A * | 8/1992 | Barbe' et al. | 502/109 |
| 5,286,791 A * | 2/1994 | DeNicola et al. | 525/71 |
| 5,338,764 A | 8/1994 | Lesca et al. | |
| 5,362,782 A | 11/1994 | McCullough, Jr. et al. | |
| 5,587,436 A | 12/1996 | Klimek et al. | |
| 5,641,848 A * | 6/1997 | Giacobbe et al. | 526/348.1 |
| 6,022,628 A | 2/2000 | Chatterjee et al. | |
| 6,111,039 A * | 8/2000 | Miro et al. | 526/128 |
| 6,177,502 B1 * | 1/2001 | Hara et al. | 524/451 |
| 6,191,223 B1 * | 2/2001 | Dolle et al. | 525/191 |
| 6,303,709 B1 | 10/2001 | Jauniaux | |
| 6,306,973 B1 * | 10/2001 | Takaoka et al. | 525/240 |
| 6,350,828 B1 * | 2/2002 | Takaoka et al. | 526/125.3 |
| 6,630,538 B1 * | 10/2003 | Ellul et al. | 525/194 |
| 6,686,433 B1 * | 2/2004 | Miro et al. | 526/351 |
| 6,689,845 B1 * | 2/2004 | Govoni et al. | 526/65 |
| 6,696,520 B1 * | 2/2004 | Pellegatti et al. | 525/88 |
| 6,716,921 B1 | 4/2004 | Nakashima et al. | |
| 6,800,710 B2 | 10/2004 | Pelliconi et al. | |
| 6,875,826 B1 * | 4/2005 | Huovinen et al. | 526/64 |
| 7,294,681 B2 | 11/2007 | Jiang et al. | |
| 7,381,773 B2 | 6/2008 | Pelliconi et al. | |
| 7,390,575 B2 | 6/2008 | Tayano et al. | |
| 2008/0090982 A1 | 4/2008 | Cagnani et al. | |

FOREIGN PATENT DOCUMENTS

| | | |
|---|---|---|
| EP | 45977 | 2/1982 |
| EP | 361494 | 4/1990 |
| EP | 395083 | 10/1990 |
| EP | 553805 | 8/1993 |
| EP | 553806 | 8/1993 |
| EP | 560035 | 9/1993 |
| EP | 573862 | * 12/1993 |
| EP | 601525 | 6/1994 |
| EP | 634441 | 1/1995 |
| EP | 728769 | 8/1996 |
| EP | 736552 | * 9/1996 |
| EP | 757069 | 2/1997 |
| EP | 782587 | 7/1997 |
| EP | 942013 | 9/1999 |
| EP | 1026198 | 8/2000 |
| EP | 1038893 | 9/2000 |
| EP | 1242483 | 9/2002 |
| EP | 1272533 | 1/2003 |
| EP | 1428853 | 6/2004 |
| EP | 1448622 | 8/2004 |
| EP | 1674530 | 6/2006 |
| WO | 98/44009 | 10/1998 |
| WO | 99/16797 | 4/1999 |
| WO | 99/36466 | 7/1999 |
| WO | 00/02929 | 1/2000 |
| WO | 00/63261 | 10/2000 |
| WO | 01/92406 | 12/2001 |
| WO | 02/30998 | 4/2002 |
| WO | 03/082971 | 10/2003 |
| WO | WO 2005014715 | * 2/2005 |
| WO | 2005/113622 | 12/2005 |
| WO | 2006/082144 | 8/2006 |
| WO | 2006/114357 | 11/2006 |
| WO | 2006/120190 | 11/2006 |

* cited by examiner

*Primary Examiner* — Irina Krylova

(57) ABSTRACT

Propylene homopolymers or copolymers containing up to 5.0 wt % of alpha-olefin units having from 2 to 8 carbon atoms other than propylene, characterized in that said propylene homopolymers or copolymers have Polydispersity Index value higher than 15, Melt Strength higher than 1.50 cN at 230° C. and Melt Flow Rate (ISO1133, 230° C./2.16 Kg) from 0.01 to 20 g/10 min.

10 Claims, No Drawings

PROPYLENE POLYMERS HAVING BROAD MOLECULAR WEIGHT DISTRIBUTION

This application is the U.S. national phase of International Application PCT/EP2006/063535, filed Jun. 26, 2006, claiming priority to European Patent Application 05106024.2 filed Jul. 1, 2005, and the benefit under 35 U.S.C. 119(e) of U.S. Provisional Application No. 60/697,488, filed Jul. 8, 2005; the disclosures of International Application PCT/EP2006/063535, European Patent Application 05106024.2 and U.S. Provisional Application No. 60/697,488, each as filed, are incorporated herein by reference.

The present invention relates to propylene polymers having broad molecular weight distribution and high melt strength.

It is known in the art that the processability in the molten state of propylene homo- and copolymers is mainly influenced by the molecular weight, normally expressed in terms of melt flow rates (MFR), and the molecular weight distribution (MWD). The molecular weight distribution can be either expressed as the ratio of the weight average molecular weight Mw to the number average molecular weight Mn or as the Polydispersity Index (P.I.). Propylene polymers having broad molecular weight distribution or high Polydispersity Index have a lower melt viscosity than polymers having a narrow molecular weight distribution. As a result, said broad MWD propylene polymers flows more readily in thermoforming, injection molding, blow molding or stretch blow molding, coating and film conversion.

However, for certain applications, such as polymer foams, products having different flowability in combination with high melt strength are particularly desirable. It is known in the art to produce said polymers by melt blending propylene polymer fractions having different molecular weight or to produce reactor-blends of said fractions in multi-step polymerization processes.

For example, the International Patent Application WO99/16797 discloses a high melt strength propylene polymer comprising a high molecular weight portion and a low molecular weight portion, having MFR from 0.1 to 20 g/10 min, said propylene polymer being obtainable in at least two polymerization steps. Said propylene polymers have MWD higher than 6, the highest value of the MWD herein described being 10.

The European patent EP573862 describes broad MWD propylene polymers having high MWD, MFR greater than 2 g/10 min. and high melt strength, obtainable in two or more polymerization steps. The melt strength of the propylene polymers herein described increases as the MWD increases. However, for very high values of the MWD the mechanical properties of the polymers worsen and the polymers tend to be very brittle, as illustrated in the comparative examples 1 and 2.

It is therefore an object of the present invention to provide readily processable propylene homo- or copolymers which have good flow properties in the molten state and high melt strength while retaining good mechanical properties, in particular high rigidity, high stress at yield high creep resistance and high heat distortion resistance. The present invention provides propylene homopolymers or propylene copolymers containing up to 5.0 wt % of alpha-olefin units having from 2 to 8 carbon atoms other than propylene, characterized in that said propylene homopolymers or copolymers have Polydispersity Index (P.I.) value higher than 15, Melt Strength higher than 1.50 cN at 230° C. and Melt Flow Rate (ISO1133, 230° C./2.16 Kg) from 0.01 to 20 g/10 mm.

The propylene homo- or copolymers of the present invention are characterized by a very broad molecular weight distribution (VBMWD hereinafter) as indicated by the high values of P.I. Preferably, the P.I. value ranges from 15 to 50, more preferably from 20 to 45, particularly preferably from 20 to 35. Thanks to their high P.I. values, the processability of the propylene homo- or copolymers of the present invention is considerably improved with respect to conventional propylene homo- or copolymers. The Polydispersity Index (P.I.) is Theologically measured under the conditions indicated below.

The Melt Strength value is a measure of the applied linear force needed to break the polymer melt. The Melt Strength, measured at 230° C., of the VBMWD propylene homo- or copolymers of the invention is higher than 1.50 cN, preferably the Melt Strength value ranges from 2.00 to 12.00 cN, more preferably from 2.00 to 8.00 cN, particularly preferably from 2.50 to 5.00 cN.

The MFR (measured according to ISO1133, 230° C./2.16 Kg) of the VBMWD homo- or copolymers of the invention ranges from 0.01 to 20 g/10 min, preferably from 0.01 to 4.00 g/10 min, particularly preferably from 0.5 to less than 2.0 g/10 min.

For the preparation of the VBMWD propylene copolymers of the present invention propylene units are polymerized in the presence of at least one alpha-olefin having 2 to 8 carbon atoms other than propylene. Preferred alpha-olefins are linear $C_2$-$C_8$-1-alkenes. Particularly preferred are ethylene, 1-butene, 1-pentene, 1-hexene, 1-heptene, 1-octene, 4-methyl-1-pentene, in particular ethylene or 1-hexene. The VBMWD propylene copolymers of the invention preferably comprise 0.5 to 3.0 wt % of alpha-olefin units, more preferably from 1.2 to 1.8 wt %. The propylene copolymer may optionally comprise a conjugated or un-conjugated diene, such as butadiene, 1,4-hexadiene, 1,5-hexadiene and ethylidene-norbornene-1. When present, the diene is typically in an amount from 0.5 to 10 wt %.

The VBMWD propylene homo- or copolymers of the invention preferably may also have at least one property of the following set:

Xylene soluble fraction, measured according to the method described below, of less than 6 wt %, preferably of less than 4 wt %; and/or Flexural Modulus (measured according to ISO178) from 1100 to 2500 MPa, preferably from 1500 to 2000 MPa; and/or Izod Impact value at 23° C. (measured according to ISO 180/1A) of less than 50.0 kJ/m$^2$, preferably less than 15.0 kJ/m$^2$, more preferably less than 10.0 kJ/m$^2$, particularly preferably from 3.0 to 5.0 kJ/m$^2$; and/or Stress at Yield (measured according to ISO 527) greater than 21 MPa, preferably in the range from 25 to 45 MPa, more preferably from 30 to 40 MPa.

According to a preferred embodiment, the VBMWD propylene homo- or copolymers of the invention are further characterized by a number of gels No(≥0.2 mm) of less than 400, preferably by a number of gels No(≥0.1 mm) of less than 400. The number of gels is indicative of the homogeneity of the product: the lower the number of gels, the greater the homogeneity of the polymer. The homogeneity of the material is particularly critical for the use in blow molding and in the production of thin films, where the presence of even small amounts of non-homogeneous material is manifested by the presence of unmelted particles.

The VBMWD propylene homo- or copolymers of the present invention may further comprise additives commonly employed in the polyolefin field, such as antioxidants, light stabilizers, nucleating agents, antiacids, colorants, fillers and processing improvers, like polyterpenes. In particular, the addition of nucleating agents brings about a considerable improvement in important physical mechanical properties. Typical examples of suitable nucleating agents are microtalc, salts of monocarboxylic or polycarboxylic acids, e.g. sodium benzoate or aluminum tert-butylbenzoate, dibenzylidenesorbitol or its $C_1$-$C_8$-alkyl-substituted derivatives such as methyldibenzylidenesorbitol, ethyldibenzylidenesorbitol or dimethyldibenzylidenesorbitol or salts of diesters of phosphoric acid, e.g. sodium 2,2'-methylenebis(4,6-di-tert-butylphenyl)phosphate. Normally, the nucleating agents are added to the VBMWD propylene homo- or copolymers in an amount ranging from 0.05 to 2 wt %, preferably from 0.1 to 1.0 wt %, with respect to the polymer.

The VBMWD propylene homo- or copolymers of the present invention can be prepared in presence of highly stereospecific heterogeneous Ziegler-Natta catalyst systems capable of catalyzing the production of high molecular weight propylene polymers as well as medium and low molecular weight propylene polymers.

The Ziegler-Natta catalysts suitable for producing the VBMWD propylene homo- or copolymers of the invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP 1272533 and in the international patent application WO00/63261. Preferably, the solid catalyst component comprises Mg, Ti, halogen and an electron donor selected from succinates of formula (I):

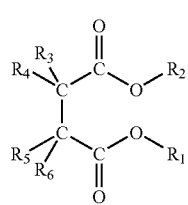

(I)

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R_3$ to $R_5$ are hydrogen and $R_6$ is a branched alkyl, cycloalkyl, aryl, arylalkyl and alkylaryl radical having from 3 to 10 carbon atoms. Another preferred group of compounds within those of formula (I) is that in which at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom. Furthermore, also the compounds in which at least two radicals different from hydrogen are linked to different carbon atoms, that is $R_3$ and $R_5$ or $R_4$ and $R_6$ are particularly preferred.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The internal donor can be added during the treatment with $TiCl_4$ and the treatment with the electron donor compound can be repeated one or more times. Generally, the succinate of formula (I) is used in molar ratio with respect to the $MgCl_2$ of from 0.01 to 1 preferably from 0.05 to 0.5. The preparation of catalyst components in spherical form is described for example in European patent application EP-A-395083 and in the International patent application WO98/44009. The solid catalyst components obtained according to the above method show a surface area (by B.E.T. method) generally between 20 and 500 m$^2$/g and preferably between 50 and 400 m$^2$/g, and a total porosity (by B.E.T. method) higher than 0.2 cm$^3$/g preferably between 0.2 and 0.6 cm$^3$/g. The porosity (Hg method) due to pores with radius up to 10,000 Å generally ranges from 0.3 to 1.5 cm$^3$/g, preferably from 0.45 to 1 cm$^3$/g.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

Preferred external electron-donor compounds include silicon compounds, esters such as ethyl 4-ethoxybenzoate, heterocyclic compounds and particularly 2,2,6,6-tetramethyl piperidine and ketones. Another class of preferred external donor compounds is that of silicon compounds of formula $R_a^5 R_b^6 Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1,trifluoropropyl-metil-dimethoxysilane. The external electron donor compound is used in such an amount to give a molar ratio between the organo-aluminum compound and said electron donor compound of from 0.1 to 500.

The VBMWD propylene homo- or copolymers of the invention can be preferably produced by a gas-phase polymerization process carried out in at least two interconnected polymerization zones. Said polymerization process is described in the European patent EP 782587 and in the International patent application WO00/02929.

The process is carried out in a first and in a second interconnected polymerization zone to which propylene and ethylene or propylene and alpha-olefins are fed in the presence of a catalyst system and from which the polymer produced is discharged. The growing polymer particles flow through the first of said polymerization zones (riser) under fast fluidization conditions, leave said first polymerization zone and enter the second of said polymerization zones (downcomer) through which they flow in a densified form under the action of gravity, leave said second polymerization zone and are reintroduced into said first polymerization zone, thus establishing a circulation of polymer between the two polymerization zones. Generally, the conditions of fast fluidization in the first polymerization zone is established by feeding the monomers gas mixture below the point of reintroduction of the growing polymer into said first polymerization zone. The velocity of the transport gas into the first polymerization zone is higher than the transport velocity under the operating conditions and is normally between 2 and 15 m/s. In the second polymerization zone, where the polymer flows in densified form under the action of gravity, high values of density of the solid are reached which approach the bulk density of the polymer; a positive gain in pressure can thus be obtained along the direction of flow, so that it becomes possible to reintroduce the polymer into the first reaction zone without the help of mechanical means. In this way, a "loop" circulation is set up, which is defined by the balance of pressures between the two polymerization zones and by the head loss introduced into the system. Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases. The operating parameters such as, for example, the temperature are those that are usual in gas-phase olefin polymerization processes, for example between 50° C. and 120° C., preferably from 70° C. to 90° C. The process can be carried out under operating pressure of between 0.5 and 10 MPa, preferably between 1.5 and 6 MPa. Preferably, the various catalyst components are fed to the first polymerization zone, at any point of said first polymerization zone. However, they can also be fed at any point of the second polymerization zone.

In the polymerization process means are provided which are capable of totally or partially preventing the gas and/or liquid mixture present in the raiser from entering the downcomer and a gas and/or liquid mixture having a composition different from the gas mixture present in the raiser is introduced into the downcomer. According to a preferred embodiment, the introduction into the downcomer, through one or more introduction lines, of said gas and/or liquid mixture having a composition different from the gas mixture present in the raiser is effective in preventing the latter mixture from entering the downcomer. The gas and/or liquid mixture of different composition to be fed to the downcomer can optionally be fed in partially or totally liquefied form. The molecular weight distribution and thus the P.I. value of the growing polymers can be conveniently tailored by carrying out the polymerization process in an reactor diagrammatically represented in FIG. 4 of the International Patent Application WO00/02929 and by independently metering the comonomer(s) and customary molecular weight regulators, particularly hydrogen, in different proportion into at least one polymerization zone, preferably into the raiser.

The VBMWD propylene homo- or copolymers of the present invention may be optionally blended with polymers having different crystalline structures. For example, the VBMWD propylene polymers of the invention may be blended with polyethylene having from low to high density, with SEBS (styrene-ethylene/butadiene-styrene) copolymers or ABS (acrylonitrile-butadiene-styrene) copolymers, or with polyterpenes. In order to improve the balance of different mechanical properties (for example the balance between flexural modulus and impact resistance), the VBMWD propylene homo- or copolymers of the present invention can also comprise opportune amounts of elastomers. Said elastomers can be prepared separately and added to the VBMWD homo- or copolymers defined above by way of blending in the molten state (open dry blends), or they may be "reactor blends", i.e. they can be prepared directly in synthesis using an additional polymerization stage. In general, suitable elastomers are the ones commonly used to confer better impact resistance to polyolefins. Examples of olefinic elastomers are ethylene-propylene copolymers containing from 30 to 85 mole % of ethylene (EPR rubbers), and optionally from 5 to 15 mole % of $C_4$-$C_8$ alpha-olefins, in particular are 1-butene, 1-pentene, 1-hexene, 4-methyl-1-pentene. Other examples of suitable elastomers are ethylene-propylene-diene terpolymers (EPDM rubbers) containing from 30 to 85 mole % of ethylene, and from 0.5 to 10 mole % of diene, optionally containing from 5 to 15 mole % of $C_4$-$C_8$ alpha-olefins, in particular are 1-butene, 1-pentene, 1-hexene, 4-methyl-1-pentene. Preferred examples of dienes for the EPDM rubbers are: 1,4-hexadiene; dicyclopentadiene; 2-ethylidene-5-norbornene. Generally speaking, the VBMWD propylene homo- or copolymers of the present invention may comprise 2-50 wt %, with respect to the weight of said polymers and copolymers, preferably from 5 to 20 wt %, more preferably from 5 to 15 wt %, of the above-mentioned olefinic elastomers.

The VBMWD propylene polymers of the invention can be used for the manufacturing of foamed articles, such as laminated and un-laminated sheet, beads, and profiles. Foams having densities in the range from 30 to 700 Kg/m$^3$, in particular from 100 to 600 Kg/m$^3$, can be obtained from the VBMWD propylene polymers of the invention, finding application for thermal and electrical insulation, for noise and vibration damping, shock absorption and weight reduction. In particular they can find application in the automotive field for bumper interiors and impact panels, in marine field as floating devices or in electrical cables insulation. The VBMWD propylene homo- or copolymers of the present invention may be manufactured into foamed article by conventional methods. They may be extruded in the presence of at least one foaming agent in conventional single screw or twin screw extruders, both in single and multilayer constructions. Foaming agents can be physical foaming agents, such as $CO_2$, gaseous hydrocarbons, $H_2O$, CFCs or mixtures thereof, or chemical foaming agents, such as inorganic carbonates, citric acid or their mixtures. Alternatively, the VBMWD propylene homo- or copolymers can be firstly pelletized and foamed and subsequently molded for the manufacturing of foamed polypropylene beads according to processes well known in the art. Foamed articles such as foamed coated or uncoated pipes and foamed packaging for foods can be manufactured using the VBMWD propylene polymers of the invention.

Heterophasic polypropylene compositions comprising the VBMWD propylene polymers of the invention as matrix phase are particularly suitable for manufacturing foamed articles. Thus, a further object of the present invention is a heterophasic polypropylene composition comprising (percentage based on the whole composition):
(1) 65-95 wt %, preferably 70-95 wt %, more preferably 80-92 wt %, of a propylene homopolymer or copolymer containing up to 5.0 wt % (based on the component (1)) of alpha-olefin units having from 2 to 8 carbon atoms other than propylene, said propylene homopolymer or copolymer having P.I. value higher than 15, Melt Strength higher than 1.50 cN at 230° C. and Melt Flow Rate (ISO1133, 230° C./2.16 Kg) from 0.01 to 20 g/10 min; and
(2) 5-35 wt %, preferably 5-30 wt %, more preferably 8-20 wt %, of a propylene copolymer containing 35-95 wt %, preferably 50-90 wt %, more preferably 60-85 wt % (based on component (2)), of alpha-olefin units having 2 to 8 carbon atoms other than propylene.

The component (1) may have any of the properties of the VBMWD propylene homopolymers or copolymers described in the foregoing. The component (2) optionally has an intrinsic viscosity measured in tetrahydronaphthalene at 135° C. ranging from 1.80 to 3.00 dl/g, preferably from 2.10 to 2.80 dl/g and a xylene soluble fraction higher than 35 wt %, preferably higher than 50 wt %, more preferably higher than 65 wt % Preferred alpha olefins are ethylene, 1-butene, 1-pentene, 1-hexene and 4-methyl-1-pentene, ethylene being particularly preferred.

Said heterophasic polypropylene composition is preferably an as-reactor blend prepared in a two step polymerization process, wherein the component (1) is prepared in the first polymerization step as described in the foregoing and subsequently the growing polymer, together with the catalyst system and optionally the molecular weight regulator, is transferred into a second preferably gas-phase reactor operated at standard conditions of temperature and pressure where the component (2) is produced. Standard conditions of temperature and pressure are the same as indicated in the foregoing.

When used to produce foamed articles, said heterophasic polypropylene compositions may optionally comprise customary amounts of additives as described in the foregoing. Said heterophasic polypropylene composition may optionally be blended with up to 35 wt % (based on the resulting composition), preferably from 5 to 35 wt %, more preferably from 10 to 25 wt %, of low or medium density polyethylene, i.e. with a polyethylene, preferably an ethylene homopolymer, having density ranging from 0.915 to 0.940 g/cm3 (measured according to ISO 1133). Suitable low or medium density polyethylenes have a melt flow rate ranging from 0.5 to 2.5 g/10 min (measured according to ISO1133, at 190° C./2.16 Kg).

The VBMWD propylene homo- or copolymers of the present invention find further applications, either alone or blended as reactor blends or as extruder blends with other suitable polyolefins, in the production of molded articles, such as thermoforming, injection molding, blow molding, in particular large blow molding, or stretch blow molding. Said VBMWD propylene polymers may also be used for coating, in particular extrusion coating, and film making for food and non-food packaging applications, as well as in pipe field, preferably for the manufacturing of corrugated pipes. Moreover, the VBMWD propylene homo- or copolymers of the invention, optionally blended with other suitable polyolefins, can be used for the manufacturing of large extruded sheets, fibers, filaments and cables.

It has been surprisingly found that the VBMWD propylene polymers of the invention may be used in a process for producing injection molded articles to reduce the tiger striping of injection molded articles, in particular large injection molded articles such as automobile bumpers. Tiger striping refers to color and/or gloss variations on the surface of injection molded articles and is strongly influenced by the flowing properties of the molten polymers. It has been found that thermoplastic polyolefin compositions comprising up to 25 wt %, preferably from 5 to 25 wt %, more preferably from 5 to 20 wt %, of propylene homopolymers or propylene copolymers (A) containing up to 5.0 wt % (referred to the component (A)) of alpha-olefin units having from 2 to 8 carbon atoms other than propylene, said propylene homopolymers or copolymers having P.I. value higher than 15, Melt Strength higher than 1.50 cN at 230° C. and Melt Flow Rate (ISO1133, 230° C./2.16 Kg) from 0.01 to 20 g/10 min are particularly suitable for use in a process for producing injection molded articles showing minimal tiger striping. Said thermoplastic polyolefin compositions may comprise any suitable polyolefin or blend of polyolefins conventionally used for producing injection molded articles.

According to a particularly advantageous embodiment, the thermoplastic polyolefin composition comprises:
(A) 5-25 wt %, preferably 10-20 wt %, of propylene homopolymers or copolymers containing up to 5.0 wt % (based on the component (A)) of alpha-olefin units having from 2 to 8 carbon atoms other than propylene, said propylene homopolymers or copolymers having P.I. value higher than 15, Melt Strength higher than 1.50 cN at 230° C. and Melt Flow Rate (ISO1133, 230° C./2.16 Kg) from 0.01 to 20 g/10 min;
(B) 15-35 wt %, preferably 20-30 wt %, of an elastomeric copolymer of ethylene containing 15-70 wt %, preferably 2040 wt % (based on the component (B)), of alpha olefin units having 3 to 10 carbon atoms, said elastomeric copolymer of ethylene preferably having density lower than 0.89 g/cm$^3$ and/or Mw/Mn lower than 4, more preferably lower than 3 and/or a Shore A hardness (according to ASTM D2240) lower than 90 points, more preferably lower than 75 points, said elastomeric copolymer of ethylene optionally containing 0.5-10 wt % of units deriving from a diene;
(C) 10-30 wt %, preferably 15-25 wt %, of a propylene homopolymer or copolymer containing up to 5.0 wt %, preferably from 0.01 to 2.5 wt % (based on the component (C)), of alpha-olefin units having from 2 to 8 carbon atoms other than propylene and having MFR (ISO1133, 230° C./2.16 Kg) higher than 1500 g/10 min, preferably from 1700 to 2800 g/10 min and optionally having Mw/Mn lower than 3.5, preferably lower than 2.0, and/or a xylene soluble fraction lower than 10 wt %; and
(D) 15-35 wt %, preferably 20-30 wt %, of a heterophasic polypropylene composition comprising (based on the component (D)):
(i) 40-95 wt %, preferably 60-90 wt %, of a propylene homopolymer having xylene soluble fraction lower than 10 wt %, preferably lower than 5 wt %, or of a propylene copolymer containing up to 15 wt %, preferably 0.5-10 wt % (based on component (i)) of alpha-olefin units having 2 to 8 carbon atoms other than propylene, said copolymer (ii) having a xylene soluble fraction lower than 15 wt %, preferably lower than 10 wt %;

(ii) 5-60 wt %, preferably 10-40 wt %, of a propylene copolymer containing 15-60 wt % (based on component (ii)), of alpha-olefin units having 2 to 8 carbon atoms other than propylene, said copolymer having a xylene soluble fraction higher than 80 wt %, more preferably being completely soluble in xylene;

said heterophasic polypropylene composition (D) optionally having a MFR (ISO1133, 230° C./2.16 Kg) higher than 80 g/10 min.

The thermoplastic polyolefin compositions showing minimal tiger striping may be conveniently prepared by known methods such as melt blending the components (A) to (D) and optionally a customary amount of the additives mentioned hereinabove.

The Melt Strength of the VBMWD propylene homo- or copolymers of the present invention can be further increased by subjecting said VBMWD propylene polymers to at least partial reticulation according to processes known in the art, for example subjecting them to an irradiation process as described in U.S. Pat. No. 4,916,198 or to partial cross-linking in the presence of peroxides as described in U.S. Pat. No. 5,047,485.

The following examples are given to illustrate and not to limit the present invention.

EXAMPLES

The data were obtained according to the following methods:

Polydispersity Index (P.I.)

Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=10^5/Gc$$

in which Gc is the crossover modulus defined as the value (expressed in Pa) at which $G'=G''$ wherein $G'$ is the storage modulus and $G''$ is the loss modulus.

Melt Strength

The apparatus used is a Toyo-Sieki Seisakusho Ltd. melt tension tester provided with a computer for data processing. The method consists in measuring the tensile strength of a strand of molten polymer stretched at a specific stretch velocity. In particular, the polymer to be tested is extruded at 230° C. at 0.2 mm/min through a die with a capillary hole 8 mm long and 1 mm in diameter. The exiting strand is then stretched, by using a system of traction pulleys, at a constant acceleration of 0.0006 m/sec$^2$, measuring the tension until the breaking point. The apparatus registers the tension values of the strand as a function of the stretching. The melt strength corresponds to the melt tension at polymer break.

Melt Flow Rate (MFR)

Determined according to ISO 1133 (230° C., 2.16 Kg)

Xylene-Soluble Faction 2.5 g of polymer and 250 mL of o-xylene are introduced in a glass flask equipped with a refrigerator and a magnetical stirrer. The temperature is raised in 30 minutes up to the boiling point of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and 100 ml of the filtered liquid is poured in a previously weighed aluminum container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Number of Gels (Fisheye Count)

The determination of the number of gels per m$^2$ is carried out by visually detecting the number of gels of a sample film projected by a projector on a white wall-chart with a magnificated scale. Film pieces of 130×7.5 cm are cut from a cast film at least 30 minutes after extrusion (die temperature in the range from 250° to 290° C., chill rolls temperature 20° C.). The film thickness is of 0.1 mm propylene homopolymers and of 0.05 mm for propylene copolymers. The counting is made on 5 different pieces of the same film and a final number is given by the expression No=A/S where No is the number of gels per m$^2$, A is the number of gels counted on 5 film pieces and S is the overall surface in m$^2$ of the 5 films pieces examined. Gels of irregular shape are measured at the point of maximum extension.

Flexural Modulus

Determined according to ISO 178

IZOD Impact Strength

Determined according to ISO 180/1A

Stress and Elongation at Yield and at Break

Determined according to ISO 527

Comonomer (C2) Content

By IR spectroscopy.

Molar Ratio of Feed Gasses

Determined by gas-chromatography

Intrinsic Viscosity

Determined in tetrahydronaphthalene at 135° C.

Melting Temperature, Melting Enthalpy and Crystallization Temperature

Determined by DSC with a temperature variation of 20° C. per minute

Tiger Striping

The molten polymer was injected into a hollow spiral mold under specified conditions of temperature (controlled by a thermostatic water bath), at an injection pressures of 180 bar. The spiral flow, i.e. the total length of solidified polymeric material is recorded and the start point of the tiger striping was visually determined. The following processing conditions were used:

| Cylinder temperature | | |
|---|---|---|
| Zone 1 | ° C. | 200 |
| Zone 2 | ° C. | 210 |
| Zone 3 | ° C. | 220 |
| Zone 4 | ° C. | 230 |
| Nozzle | ° C. | 230 |
| Injection speed | mm/sec | 10 |
| Back pressure | bar | 10 |
| Transfer pressure | bar | 100 |
| Holding pressure | bar | 28 |
| Holding time | sec | 15 |
| Cooling time | sec | 20 |

The tiger striping is expressed as the ratio of the tiger stripes start point with respect to the total spiral flow.

Examples 1-4

The solid catalyst used in the following examples was prepared according to the Example 10 of the International Patent Application WO 00/63261. Triethylaluminium (TEAL) was used as co-catalyst and dicyclopentyldimethoxysilane as external donor, with the weight ratios indicated in Table 1.

The propylene polymer compositions of the examples were prepared in one single polymerization step by feeing the monomers and the catalyst system to a gas-phase polymerization reactor comprising two interconnected polymerization zones, a riser and a downcomer, as described in the International patent application WO00/02929. The indicated amounts of comonomer of examples 2 to 4 were fed exclusively into the first polymerization zone (raiser); in example 5, the comonomer was fed to the riser and to the downcomer. The molecular weight regulator, i.e. hydrogen, was fed only to the riser in all the examples. The polymerization conditions are indicated in Table 1.

The obtained polymer particles were subjected to a steam treatment to remove the unreacted monomers and dried. The additives were added to the polymers during extrusion in a Werner 53 extruder operating at standard conditions. The mechanical properties of the VBMWD propylene homo- and copolymers thus obtained are collected in Table 2.

TABLE 1

| EXAMPLE | | 1 | 2 | 3 | 4 | 5 |
|---|---|---|---|---|---|---|
| TEAL/Donor | g/g | 5 | 3 | 5 | 2.5 | 2.5 |
| TEAL/Catalyst | g/g | 5 | 6 | 6 | 5 | 5 |
| Temperature | °C. | 80 | 85 | 85 | 80 | 80 |
| Pressure | MPa | 2.8 | 2.8 | 2.8 | 2.8 | 2.8 |
| H2/C3 | mol/mol | | 0.25 | 0.25 | 0.041 | 0.00765 |
| P.I. | | 39.4 | 42.6 | 31.5 | 25.0 | 30.0 |
| MFR | g/10' | 2.0 | 2.7 | 3.3 | 1.5 | 1.0 |
| C2 | wt % | / | 1.65 | 1.60 | 1.3 | 1.8 |
| X.S. | wt % | 1.8 | 5.2 | 4.7 | 3.1 | 3.4 |

The invention claimed is:

1. A propylene copolymer comprising:
   (i) 0.5 to 5 wt. %, based on the total weight of the copolymer, of ethylene derived units; and
   (ii) 95 to 99.5 wt. %, based on the total weight of the copolymer, of propylene derived units,
   wherein the copolymer has;
   a Polydispersity Index value from 20 to 35;
   a Melt Strength higher than 1.50 cN at 230° C.;
   a Flexural Modulus (ISO178) from 1500 to 2000 MPa;
   a number of gels No($\geq$0.2 mm) of less than 400; and
   a Melt Flow Rate (ISO1133, 230° C./2.16 Kg) from 0.5 to less than 1.7 g/10 min,
   wherein the propylene copolymer is produced in a single polymerization step by feeding the monomers and the catalyst system to a gas-phase polymerization reactor comprising two interconnected polymerization zones.

2. The propylene copolymer according to claim 1 further comprising a xylene soluble fraction of less than 6 wt %.

3. The propylene copolymer according to claim 1 further comprising an Izod Impact value at 23° C. (ISO 180/1A) of less than 50.0 kJ/m$^2$.

4. The propylene copolymer according to claim 1 further comprising a Stress at Yield (ISO 527) greater than 21 MPa.

5. An article comprising:
   a copolymer comprising:
   (i) 0.5 to 5 wt. %, based on the total weight of the copolymer, ethylene derived units; and
   (ii) 95 to 99.5 wt. %, based on the total weight of the copolymer, propylene derived units,
   wherein the copolymer has;
   a Polydispersity Index value from 20 to 35;
   a Melt Strength higher than 1.50 cN at 230° C.;
   a Flexural Modulus (ISO178) from 1500 to 2000 MPa;
   a number of gels No($\geq$0.2 mm) of less than 400; and
   a Melt Flow Rate (ISO1133, 230° C./2.16 kg) from 0.5 to 1.7 g/10 min,
   wherein the propylene copolymer is produced in a single polymerization step by feeding the monomers and the catalyst system to a gas-phase polymerization reactor comprising two interconnected polymerization zones.

6. The article of claim 5 further comprising that the article is foamed.

7. A thermoplastic polyolefin composition comprising:
   5 to 25 wt % of a copolymer comprising:
   (i) 0.5 to 5 wt. %, based on the total weight of the copolymer, ethylene derived units; and
   (ii) 95 to 99.5 wt. %, based on the total weight of the copolymer, propylene derived units,
   wherein the copolymer has;
   a Polydispersity Index value from 20 to 35;
   a Melt Strength higher than 1.50 cN at 230° C.;
   a Flexural Modulus (ISO178) from 1500 to 2000 MPa;
   a number of gels No($\geq$0.2 mm) of less than 400; and
   a Melt Flow Rate (I5O1133, 230° C./2.16 Kg) from 0.5 to 1.7 g/10 min,
   wherein the propylene copolymer is produced in a single polymerization step by feeding the monomers and the catalyst system to a gas-phase polymerization reactor comprising two interconnected polymerization zones.

8. A process for producing injection molded articles comprising injection molding a polymer composition, the polymer composition comprising:
   a copolymer comprising:
   (i) 0.5 to 5 wt. %, based on the total weight of the copolymer, ethylene derived units; and
   (ii) 95 to 99.5 wt. %, based on the total weight of the copolymer, propylene derived units,
   wherein the copolymer has;
   a Polydispersity Index value from 20 to 35; a Melt Strength higher than 1.50 cN at 230° C.; a Flexural Modulus (ISO178) from 1500 to 2000 MPa; a number of gels No($\geq$0.2 mm) less than 400; and a Melt Flow Rate (ISO1133, 230° C./2.16 Kg) from 0.5 to 1.7 g/10 min,
   wherein the propylene copolymer is produced in a single polymerization step by feeding the monomers and the catalyst system to a gas-phase polymerization reactor comprising two interconnected polymerization zones.

9. An injection molded article comprising:
   5 to 25 wt % of a copolymer comprising:
   (i) 0.5 to 5 wt. %, based on the total weight of the copolymer, ethylene derived units; and
   (ii) 95 to 99.5 wt. %, based on the total weight of the copolymer, propylene derived units,
   wherein the copolymer has;
   a Polydispersity Index value from 20 to 35; a Melt Strength higher than 1.50 cN at 230° C.; a Flexural Modulus (ISO178) from 1500 to 2000 MPa a number of gels No($\geq$0.2 mm) of less than 400; and a Melt Flow Rate (ISO1133, 230° C./2.16 Kg) from 0.5 to 1.7 g/10 min,
   wherein the propylene copolymer is produced in a single polymerization step by feeding the monomers and the catalyst system to a gas-phase polymerization reactor comprising two interconnected polymerization zones.

10. A copolymer of propylene with 1.2 to 1.8 wt % of ethylene, having:

a Polydispersity Index value from 20 to 35;
a Melt Strength from 2.0 to 12.0 CN at 230° C.;
a Flexural Modulus (ISO178) from 1500 to 2000 MPa;
a Melt Flow Rate (ISO1133, 230° C./2.16 Kg) from 0.5 to 1.7 g/10 min.;
a number of gels No($\geq$0.2 min) of less than 400; and
an Izod Impact value at 23° C.C (ISO180/1A) of less than 50.0 kJ/m$^2$,
wherein the propylene copolymer is produced in a single polymerization step by feeding the monomers and the catalyst system to a gas-phase polymerization reactor comprising two interconnected polymerization zones.

* * * * *